(12) United States Patent
Nagamori et al.

(10) Patent No.: US 8,448,542 B2
(45) Date of Patent: May 28, 2013

(54) FRONT-AND-REAR-WHEEL-DRIVE VEHICLE

(75) Inventors: Takeo Nagamori, Toyota (JP); Yoshihiro Sakaguchi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/420,973

(22) Filed: Mar. 15, 2012

(65) Prior Publication Data

US 2012/0174708 A1 Jul. 12, 2012

Related U.S. Application Data

(63) Continuation of application No. PCT/JP2010/072925, filed on Dec. 20, 2010.

(30) Foreign Application Priority Data

Jan. 7, 2010 (JP) ................................ 2010-002305

(51) Int. Cl.
*F16H 37/06* (2006.01)

(52) U.S. Cl.
USPC ............................... 74/665 L; 477/3; 74/661

(58) Field of Classification Search
USPC .................... 74/665 L, 665 B, 665 D, 665 R, 74/661; 477/2, 3
See application file for complete search history.

(56) References Cited

U.S. PATENT DOCUMENTS

| | | | | |
|---|---|---|---|---|
| 5,549,172 A | * | 8/1996 | Mutoh et al. | 180/65.1 |
| 6,454,364 B1 | * | 9/2002 | Niwa et al. | 303/152 |
| 6,827,167 B2 | * | 12/2004 | Cikanek et al. | 180/65.6 |
| 7,178,618 B2 | * | 2/2007 | Komeda et al. | 180/65.275 |
| 8,195,348 B2 | * | 6/2012 | Mizutani et al. | 701/22 |
| 2003/0183431 A1 | | 10/2003 | Cikanek et al. | |
| 2009/0088914 A1 | * | 4/2009 | Mizutani et al. | 701/22 |

FOREIGN PATENT DOCUMENTS

| | | |
|---|---|---|
| EP | 0 622 264 A2 | 11/1994 |
| JP | 7-15804 A | 1/1995 |
| JP | 2003-267076 A | 9/2003 |
| JP | 2003-319510 A | 11/2003 |
| JP | 2004-112956 A | 4/2004 |
| JP | 2009-142036 A | 6/2009 |

OTHER PUBLICATIONS

International Search Report issued in PCT/JP2010/072925 dated Mar. 1, 2011.
Russian Office Action issued in Russian Patent Application No. 2012110066/01(015083) on Mar. 19, 2013.

* cited by examiner

*Primary Examiner* — Troy Chambers
*Assistant Examiner* — Gregory Prather
(74) *Attorney, Agent, or Firm* — Birch, Stewart, Kolasch & Birch, LLP (57) ABSTRACT

A front-and-rear-wheel-drive vehicle includes first and second electric drive motors which drive front and rear wheels, the second electric drive motor has a maximum torque greater than that of the first electric drive motor, a first speed reducer which reduces rotation of the first electric drive motor, a second speed reducer which reduces rotation of the second electric drive motor at a speed reduction ratio smaller than that of the first speed reducer, the speed reduction ratios of the first and second speed reducers are set in a manner that a maximum rate of rotation of one of the front and rear wheels corresponding to that of the second electric drive motor is greater than a maximum rate of rotation of the other wheel corresponding to that of the first electric drive motor.

6 Claims, 5 Drawing Sheets

FRONT-AND-REAR-WHEEL-DRIVE VEHICLE

CROSS REFERENCE TO RELATED APPLICATIONS

This application is a Continuation Application of PCT Application No. PCT/JP2010/072925, filed Dec. 20, 2010 and based upon and claiming the benefit of priority from prior Japanese Patent Application No. 2010-002305, filed Jan. 7, 2010, the entire contents of all of which are incorporated herein by reference.

BACKGROUND OF THE INVENTION

1. Field of the Invention

The present invention relates to a technology for a vehicle comprising a motor which drives front wheels and a motor which drives rear wheels.

2. Description of the Related Art

Conventionally, there has been a proposal for a vehicle comprising a motor which drives front wheels and a motor which drives rear wheels. There further has been proposed a vehicle which comprises a front-wheel drive motor and a rear-wheel drive motor as described above, and also comprises an engine for driving front wheels (for example, see Patent Literature 1).

CITATION LIST

Patent Literature

Patent Literature 1:
Jpn. Pat. Appln. KOKAI Publication No. 2004-112956

With the structure of Patent Literature 1, an engine and an auxiliary machinery for the engine, and a front-wheel drive motor are provided in a front part of a vehicle. Therefore, there is a difficulty in maintaining a space to provide a motor therein, and the vehicle tends to be heavy.

On the other side, concerning an electric car driven by a motor, there has been a proposal for downsizing the motor. To compensate for reduction in torque due to downsizing of the motor, a speed reduction ratio of a speed reducer connected to the motor is increased to maintain a torque which acts on an axle. Further, to compensate for reduction in rate of rotation of the axle by maintaining the torque, a boost system which boosts a voltage supplied to a battery is provided between the motor and the battery which supplies the motor with electric power. This allows the motor to drive at a high speed, and therefore allows the vehicle to travel in a high-speed travel range.

However, the boost system uses a large reactor which raises costs. Increase of costs is not preferable.

SUMMARY OF THE INVENTION

According to an aspect of embodiments, a front-and-rear-wheel-drive vehicle drives front and rear wheels. The front-and-rear-wheel-drive vehicle includes a first electric drive motor which drives one of the front and rear wheels; a second electric drive motor which drives the other of the front and rear wheels, and has a maximum torque greater than a maximum torque of the first electric drive motor; a first speed reducer which reduces rotation of the first electric drive motor and transmits the reduced rotation to the one of the front and rear wheels; a second speed reducer which reduces rotation of the second electric drive motor at a speed reduction ratio smaller than a speed reduction ratio of the first speed reducer, and transmits the reduced rotation to the other of the front and rear wheels. The speed reduction ratios of the first and second speed reducers are set in a manner that a maximum rate of rotation of the other of the front and rear wheels corresponding to a maximum rate of rotation of the second electric drive motor is greater than a maximum rate of rotation of the one of the front and rear wheels corresponding to a maximum rate of rotation of the first electric drive motor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
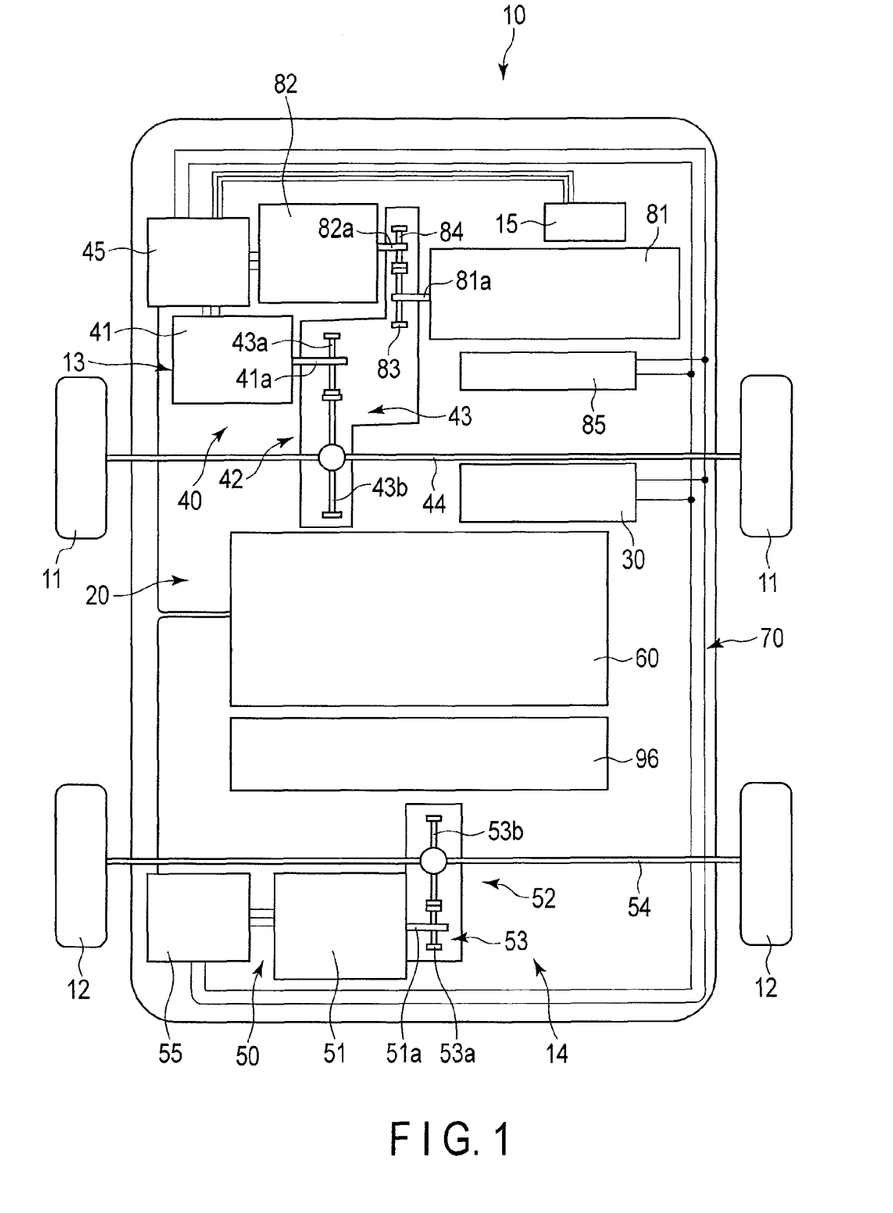
FIG. 1 is an exemplary schematic view showing a front-and-rear-wheel-drive vehicle according to the first embodiment of the invention.

A front-and-rear-wheel-drive vehicle according to the invention will be described with reference to FIGS. 1 to 6. FIG. 1 is a schematic view showing a vehicle 10. The vehicle 10 is an example of the front-and-rear-wheel-drive vehicle according to the first embodiment of the invention.

As shown in FIG. 1, in the example, the vehicle 10 is made drivable by a front motor 41 and a rear motor 51 which will be described later. The vehicle 10 comprises a pair of front wheels 11 and a pair of rear wheels 12, and can move forward and back in forward and rearward directions of the vehicle. The front wheels 11 are provided in a front portion 13 of the vehicle 10, as an example of one of the front and rear wheels as referred to in the invention. The rear wheels 12 are provided in a rear portion 14 of the vehicle 10, as an example of the other of the front and rear wheels named in the invention.

The vehicle 10 comprises a front-and-rear-wheel-drive system 20, which drives the front wheels 11 and rear wheels 12, and a vehicle controller 30.

The front-and-rear-wheel-drive system 20 comprises a front-wheel drive unit 40, a rear-wheel drive unit 50, and a battery 60.

The front-wheel drive unit 40 comprises the front motor 41 which can drive the front wheels 11 and a front-wheel transmission mechanism 42 which transmits rotation of the front motor 41 to the front wheels 11. The front motor 41 is an electric motor comprising a stator and a rotor and forms a three-phase motor which generates a torque as the rotor rotates in relation to the stator, though not shown as an example of the structure. The front motor 41 is an example of a first electric drive motor as referred to in the invention. The front motor 41 is provided in the front portion 13 of the vehicle. For example, a motor room which contains the front motor 41 is formed in the front portion 13 of the vehicle 10, and the front motor 41 may be contained in the motor room. This motor room is covered to be openable/closable relative to outside of the vehicle by a hood member not shown.

The front-wheel transmission mechanism 42 comprises a front-wheel speed reducer 43 and a front-wheel axle 44. The front-wheel speed reducer 43 reduces rotation of the front motor 41 and transmits the reduced rotation to the front-wheel axle 44 while the front motor 41 rotates. The front-wheel speed reducer 43 is an example of a first speed reducer as referred to in the invention.

The front-wheel speed reducer 43 comprises a first gear 43a, which is provided integrally with an output shaft 41a (connected to a rotor not shown whose rotation is transmitted) of the front motor 41 and rotates integrally with the output shaft 41a, and a second gear 43b which is provided on the front-wheel axle 44 and rotates integrally with the front-wheel axle 44. The first gear 43a and second gear 43b engage each other.

The front-wheel axle 44 is connected to the front wheels 11 and transmits the rotation transmitted to the front-wheel axle further to the front wheels. Rotation of the front motor 41 is transmitted to each of the front wheels 11 through the first and second gears 43a and 43b and the front-wheel axle 44.

Figure 2:
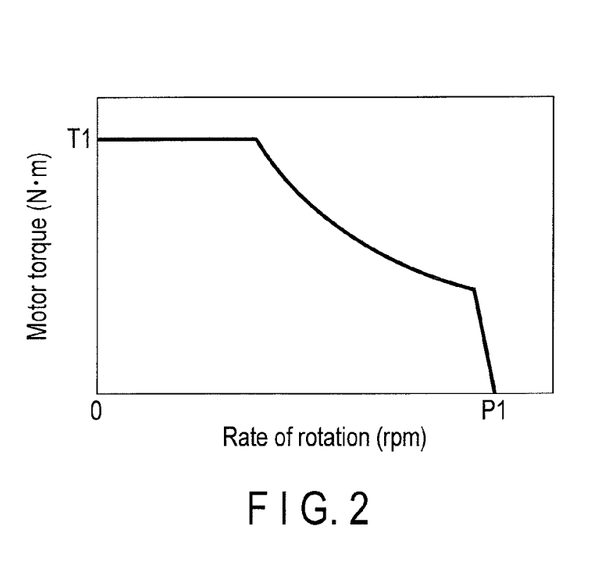
FIG. 2 is an exemplary graph showing a characteristic of a front motor shown in FIG. 1.

FIG. 2 is a graph showing a characteristic of the front motor 41. In FIG. 2, the horizontal axis represents rate of rotation of the front motor 41. The horizontal axis is expressed in units of revolutions per minute (rpm). Rightward escalation along the horizontal axis of the graph expresses increase in rate of rotation. In FIG. 2, the vertical axis represents torque of the front motor 41. A unit of N*m is applied to the vertical axis. Upward escalation along the vertical axis of the graph expresses increase in torque. As shown in FIG. 2, a maximum torque of the front motor 41 is T1 N*m. A maximum rate of rotation of the front motor is P1 rpm.

Figure 3:
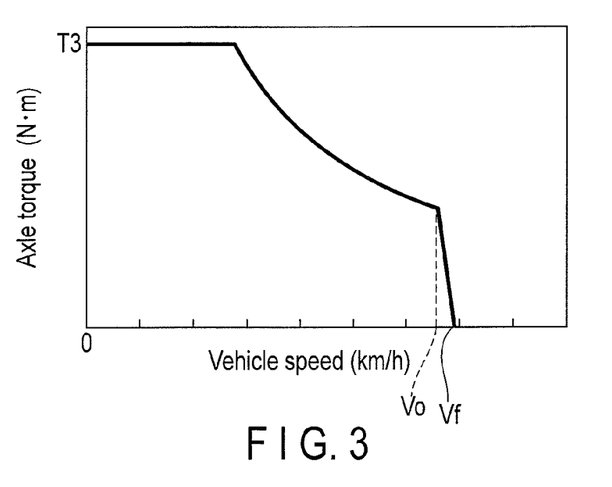
FIG. 3 is an exemplary graph showing a torque which acts on a front-wheel axle in relation to a speed of a vehicle shown in FIG. 1.

FIG. 3 is a graph showing a torque which acts on the front-wheel axle 44 in relation to a speed of the vehicle 10. In FIG. 3, the horizontal axis represents a vehicle speed of the vehicle 10. A unit of km/h is applied. Rightward escalation along the horizontal axis of the graph expresses increase in vehicle speed. In FIG. 3 the vertical axis represents torque which acts on the front-wheel axle 44. A unit of N*m is applied. Upward escalation along the vertical axis of the graph expresses increase in torque.

As shown in FIG. 3, the front motor 41 can be driven to rotate up to a speed per hour Vf within a normal drive range of the vehicle 10, as an example of the present embodiment. Vf is, for example, substantially 140 km/h. That is, the drivable speed range of the front motor 41 is zero to substantially 140 km/h. The aforementioned drivable speed range of the front motor 41 is a speed range of the vehicle 10 which can be supported (rotated) by the front motor 41. Even when only the rear motor drives in a speed range beyond 140 km/h, the front motor idles and rotates in a slave rotation state.

The front motor 41, an engine 81 described later, and a generator 82 also described later are provided in the front portion 13 of the vehicle 10, and spaces for providing the individual devices are difficult to maintain therein. Therefore, in the present embodiment, the front motor 41 has a size which can be driven in a range of the normal travel range which is demanded for the vehicle 10. In this respect, a specific description will now be made below.

The normal travel range is a range other than a high-speed travel range to perform high-speed travel on a highway, and includes, for example, a range including speeds for traveling in an urban area. The normal travel range is a range up to the substantially 140 km described above, as an example of the present embodiment. A popular motor is set to be rotatable in the high-speed travel range beyond the normal travel range, and is therefore large. However, the front motor 41 needs only to be rotatable in the normal travel range, and is therefore small.

In the present embodiment, the drivable speed range of the front motor 41 is set to, for example, the normal travel range set in the vehicle 10. The normal travel range and the high-speed travel range are arbitrarily set in the vehicle 10. For example, the normal travel range is set to zero to 120 km/h, and the high-speed travel range is set to speeds beyond 120 km/h. In this case, the front motor may have a size enough to be rotatable up to 120 km/h (including 120 km/h). In this case, Vf is 120 km/h.

In the present embodiment, a speed reduction ratio for the front-wheel speed reducer 43 (the first and second gears 43a and 43b) is set in a manner that a maximum value of torque which acts on the front-wheel axle 44 is a maximum torque value T3 N*m which is set as is required for the vehicle 10. T3 is greater than T1 (T3>T1).

As shown in FIG. 3, the torque which acts on the front-wheel axle 44 gently decreases in accordance with increase in vehicle speed until immediately before the vehicle speed reaches Vf. When the vehicle speed exceeds Vo (excluding Vo), the torque decreases abruptly. Vo is a value immediately before Vf and is, for example, 130 km/h in the present embodiment.

The front motor 41 is set to be rotatable in a manner that, after speed reduction by the speed reducer, the maximum torque which acts on the front-wheel axle 44 becomes T3 N*m and that the vehicle speed of the vehicle 10 becomes within the range of zero to substantially 140 km.

A front motor inverter 45 is provided in the front portion 13. The front motor inverter 45 is connected to the front motor 41 and controls rotation of the front motor 41. The vehicle 10 is provided with a communication network 70 such as CAN, for example. The front motor inverter 45 is connected to the communication network 70. The front motor inverter 45 is connected to a vehicle controller 30 described later through the communication network 70.

The front motor inverter 45 is provided near the front motor 41 in the front portion 13. The front motor inverter 45 converts a direct current supplied from the battery 60 into a three-phase alternating current and supplies the front motor 41 with the current to rotate the front motor 41 in response to a request from the vehicle controller 30. Further, the vehicle 10 comprises an air conditioner 15. The air conditioner 15 is connected to the front motor inverter 45 and is supplied with electric power through the front motor inverter 45.

Next, the rear-wheel drive unit 50 will be described. As shown in FIG. 1, the rear-wheel drive unit 50 comprises the rear motor 51 which can drive the rear wheels 12, a rear-wheel transmission mechanism 52 which transmits rotation of the rear motor 51 to the rear wheels 12, and a rear motor inverter 55.

The rear motor 51 is provided in the rear portion 14. For example, a motor room which can contain the front motor 51 is formed in the rear portion 14, and the rear motor 51 may be contained in the motor room. This motor room is covered to be openable/closable relatively to outside of the vehicle, for example, by a hood member.

The rear motor 51 is an electric motor comprising a stator and a rotor and forms a three-phase motor which generates torque as the rotor rotates in relation to the stator, though not shown as an example of the structure. The rear motor 51 is an example of a rear-wheel electric drive motor as referred to in the invention. The rear motor 51 is connected to the rear motor inverter 55 and is controlled to rotate by the rear motor inverter 55. The rear motor 51 is an example of a second electric drive motor as referred to in the invention.

The rear motor inverter 55 is provided near the rear motor 51 in the rear portion 14. The rear motor inverter 55 is connected to the communication network 70. The rear motor inverter 55 converts a direct current supplied from the battery 60 into a three-phase alternating current and supplies the front motor 51 with the current to rotate the front motor 41 in response to a request from the vehicle controller 30.

The rear-wheel transmission mechanism 52 comprises a rear-wheel speed reducer 53 which reduces rotation of the rear motor 51, and a rear-wheel axle 54. The rear-wheel speed reducer 53 comprises a third gear 53$a$, which is provided on an output shaft 51$a$ (rotation of a rotor not shown is transmitted) of the rear motor 51 and rotates integrally with the output shaft 51$a$, and a fourth gear 53$b$ which is provided on the rear-wheel axle 54 and rotates integrally with the rear-wheel axle 54. The third gear 53$a$ and fourth gear 53$b$ engage each other. The rear-wheel speed reducer 53 is an example of a second speed reducer as referred to in the invention.

The rear-wheel axle 54 is connected to the pair of rear wheels 12 and transmits the rotation transmitted to the rear-wheel axle further to the rear wheels 12. The rotation of the rear motor 51 is transmitted to the rear wheels 12 by the third and fourth gears 53A and 53B.

Figure 4:
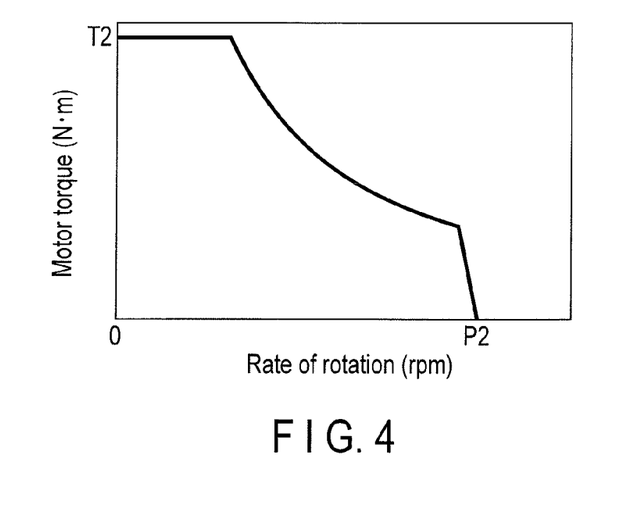
FIG. 4 is an exemplary graph showing a characteristic of a rear motor shown in FIG. 1.

FIG. 4 is a graph showing a characteristic of the rear motor 51. In FIG. 4, the horizontal axis represents a rate of rotation of the rear motor 51. The unit of rpm (revolution per minute) is applied. Rightward escalation along the horizontal axis of the graph expresses increase in rate of rotation. In FIG. 4, the vertical axis represents torque of the rear motor 51. The unit of N*m is applied. Upward escalation along the vertical axis of the graph expresses increase in torque. As shown in FIG. 4, a maximum torque of the rear motor 51 is T2 N*m.

T2 is greater than T1 (T2>T1). That is, a motor whose maximum torque is greater than that of the front motor 41 is used as the rear motor 51. The front motor 41 and the rear motor 51 each have a structure of comprising a rotor and a stator as described above. Therefore, T2>T1 is given, and accordingly, the rear motor 51 is bigger than the front motor 41. Further, a maximum rate of rotation of the rear motor 51 is smaller than the maximum rate of rotation P1 rpm of the front motor 41. The maximum rate of rotation of the rear motor 51 is P2 rpm. P1>P2.

Figure 5:
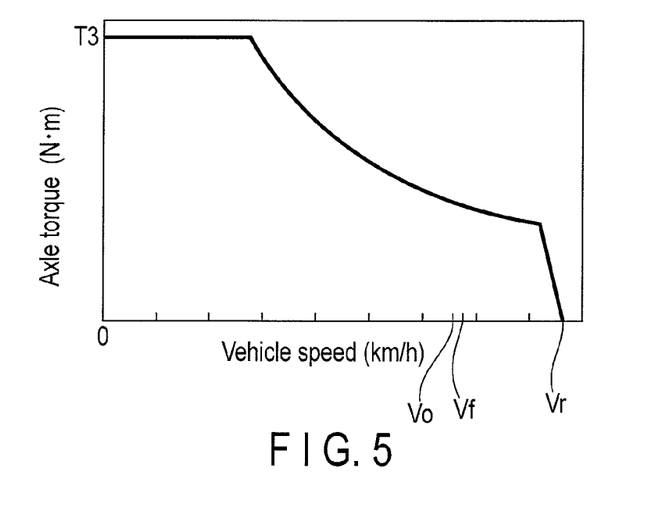
FIG. 5 is an exemplary graph showing a torque which acts on a rear-wheel axle in relation to the speed of the vehicle shown in FIG. 1.

FIG. 5 is a graph showing a relationship between the vehicle speed of the vehicle 10 and the torque which acts on the rear-wheel axle 54. In the present embodiment, a speed reduction ratio for the rear-wheel speed reducer 53 (the third and fourth gears 53$a$ and 53$b$) is set in a manner that a maximum value of torque which acts on the rear-wheel axle 54 is a maximum torque value T3 N*m which is set as is required for the vehicle 10 (T3>T2).

In the present embodiment, the speed reduction ratio of the rear-wheel speed reducer 53 is smaller than that of the front-wheel speed reducer 43. The speed reduction ratios of the front-wheel speed reducer 43 and the rear-wheel speed reducer 53 are set in a manner that the maximum value of torque which acts on the front-wheel axle 44 is equal to the maximum value of torque which acts on the rear-wheel axle 54 even when the maximum torque of the front motor 41 is different from the maximum torque of the rear motor 51.

As shown in FIG. 5, the rear motor 51 is set to be rotatable even when the vehicle speed of the vehicle 10 is in the high-speed travel range. In the present embodiment, the rear motor 51 is rotatable until a speed per hour Vr is reached. Vr is substantially 170 km/h as an example in the present embodiment. In the present embodiment, the drivable speed range of the rear motor 51 is zero to substantially 170 km/h. The aforementioned drivable speed range of the rear motor 51 is a speed range of the vehicle 10 which can be supported (rotated) by the rear motor 51. That is, the maximum rate of rotation of the rear wheels 12 is set to be greater than the maximum rate of rotation of the front wheels 11.

The relationship between the front motor 41 and the rear motor 51 as described above is set to satisfy relationships including items 1 to 3 below.

1. The maximum rate of rotation of the front motor 41 is greater than that of the rear motor 51.

2. The speed reduction ratio of the rear-wheel speed reducer 53 is smaller than that of the front-wheel speed reducer 43, and the maximum values of torques which respectively act on the front-wheel axle 44 and the rear-wheel axle 54 can be equal.

3. The maximum rate of rotation of the rear wheels 12 corresponding to the maximum rate of rotation of the rear motor 51 is greater than the maximum rate of rotation of the front wheels 11 corresponding to the maximum rate of rotation of the front motor 41. The aforementioned relationship of the maximum rate of rotation of the rear wheels 12 being greater than that of the front wheels 11 expresses the same as a relationship of the maximum speed per hour Vr of the rear motor 51 being greater than the maximum speed per hour Vf of the front motor 41.

The vehicle 10 comprises an engine 81, a generator 82, and an engine controller 85. The engine 81, the generator 82, and the engine controller 85 have a function of charging battery 60. The battery 60 is provided in substantially the center of the vehicle 10. The engine 81 is provided in the front portion 13. The engine 81 may be contained in a motor room, for example, like the front motor 41. Rotation of the engine 81 is transmitted to the generator 82 by fourth and fifth gears 83 and 84. The generator 82 is provided in the front portion 13.

The fourth gear 83 is provided on an output shaft 81$a$ of the engine 81 and rotates integrally with the output shaft 81$a$. The fifth gear 84 is provided on a rotation shaft 82$a$ of the generator 82, and rotates integrally with the rotation shaft 82$a$. The fourth and fifth gears 83 and 84 engage each other.

The engine 81 is controlled to operate by the engine controller 85. The engine controller 85 is connected to the communication network 70 and drives the engine 81 under control of the vehicle controller 30 described later.

When a fuel is supplied from a fuel tank 96 and the engine 81 is driven, rotation of the engine 81 is transmitted to the generator 82, which generates electric power. The fuel tank 96 is provided in substantially the center of the vehicle 10.

The generator 82 is provided near the front motor inverter 45 in the front unit. The generator 82 is connected to the front motor inverter 45, and the electric power generated by the generator 82 is charged into the battery 60 through the front motor inverter 45.

The vehicle controller 30 is connected to the communication network 70. The vehicle controller 30 is connected to an acceleration pedal sensor not shown, and senses a stepped amount of the acceleration pedal.

The vehicle controller 30 transmits a signal to the front motor inverter 45 and rear motor inverter 55 so as to rotate the front motor 41 and rear motor 51 in accordance with the stepped amount of the acceleration pedal (so as to rotate in accordance with a vehicle speed required for the vehicle 10). The vehicle controller 30 senses a detection result of a speed sensor not shown, and accordingly the vehicle speed of the vehicle 10.

Figure 6:
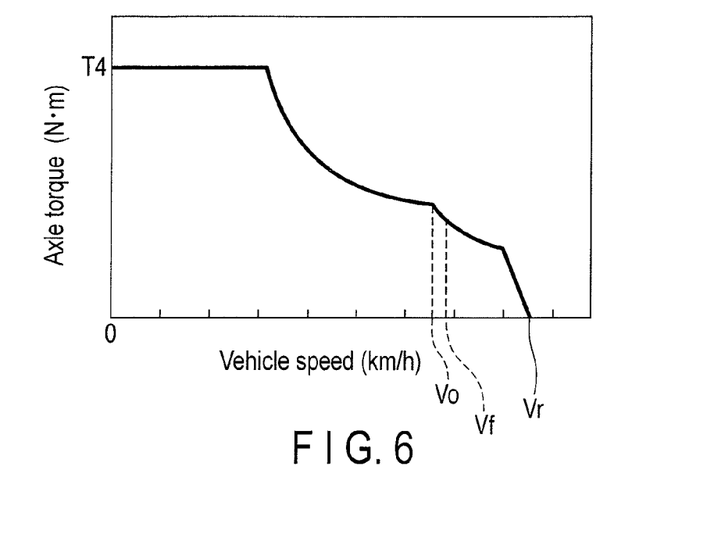
FIG. 6 is an exemplary graph showing a relationship between the vehicle speed of the vehicle shown in FIG. 1 and a total of the torque acting on the front-wheel axle and the torque acting on the rear-wheel axle.

FIG. 6 is a graph showing a relationship between the vehicle speed of the vehicle 10 and a total of the torque acting on the front-wheel axle 44 and the torque acting on the rear-wheel axle 54. In other words, FIG. 6 shows the vehicle speed of the vehicle 10 and the torques which act on the vehicle 10. In FIG. 6, the horizontal axis represents the vehicle speed of the vehicle 10. The unit of km/h is applied. Rightward escalation in the graph expresses increase in vehicle speed. In FIG. 6, the vertical axis represents the total of the torque acting on the front-wheel axle 44 and the torque acting on the rear-wheel axle 54. The unit of N*m is applied. Upward escalation in the graph expresses increase in torque.

In FIG. 6, in a speed range in which the front motor 41 can rotate (zero to speed per hour Vf in the normal travel range in the present embodiment), the front motor 41 and rear motor 51 operate simultaneously, and the vehicle 10 is therefore four-wheel drive. The maximum torque value which acts on the front-wheel axle 44 and the maximum torque value which acts on the rear-wheel axle 54 are set to an equal value. Therefore, in the normal travel range, a degree of freedom in control can be improved when the torques acting on the front wheels 11 and rear wheels 12 are controlled to adapt to traveling.

When the vehicle speed exceeds the normal travel range (when the maximum rate of rotation of the front motor 41 is exceeded, i.e., Vf is exceeded in the figure excluding the Vf), only the rear motor 51 is driven, and therefore, rear-wheel drive is performed. The maximum value of torque which acts on the vehicle 10 is T4 N*m. T4 is twice T3.

When an electric charge amount of the battery 60 becomes small, the vehicle controller 30 then drives the engine 81. When the engine 81 is driven, rotation of the output shaft 81a of the engine 81 is transmitted to the generator 82. The generator 82 receives the rotation of the engine 81 and generates electric power. The electric power generated by the generator 82 is charged into the battery 60 through the front motor inverter 45.

Next, operation of the vehicle 10 will be described. When a driver steps in on the acceleration pedal not shown to start the vehicle 10, the vehicle controller 30 then transmits a rotation request to the front motor 41 and a rotation request to the rear motor 51 in accordance with a stepped amount thereof. In place of the rotation request, a torque request may be transmitted.

The front motor inverter 45 converts a direct current supplied from the battery 60 into a three-phase alternating current and supplies the front motor 41 with the current to rotate the front motor 41 at a rate of rotation according to the request received from the vehicle controller 30.

The rear motor inverter 55 converts a direct current supplied from the battery 60 into a three-phase alternating current and supplies the rear motor 51 with the current to rotate the rear motor 51 at a rate of rotation according to the request received from the vehicle controller 30.

As shown in FIG. 6, until the vehicle speed of the vehicle 10 exceeds the drivable speed range of the front motor 41, i.e., until the vehicle speed of the vehicle 10 exceeds normal travel range, the vehicle 10 performs four-wheel drive in which the front and rear wheels 11 and 12 are driven by the front motor 41 and rear motor 51.

When the vehicle speed of the vehicle 10 exceeds a travelable speed range of the front motor 41, i.e., when the normal travel range is exceeded, the vehicle controller 30 transmits a signal to stop driving the front motor 41. The front motor inverter 45 receives the signal and then stops supplying the front motor 41 with a current. When the drivable speed range of the front motor 41 is exceeded, the vehicle 10 is driven only by the rear motor 51.

When an electric charge amount of the battery 60 is determined to be small, the vehicle controller 30 then drives the engine 81.

In the vehicle 10 configured in this manner, the drivable speed range of the front motor 41 is set to the normal travel range (a range of zero to substantially 140 km/h as an example in the present embodiment), and only the rear motor 51 drives in the high-speed travel range. Therefore, the front motor 41 can be made smaller, and the weight of the vehicle 10 can be reduced while maintaining ability to travel in the high-speed travel range.

Further, a motor having a small drivable travel speed range is used as a front motor 41, and the front motor 41 can be made smaller in the front portion 13 where the engine 81 and generator 82 are provided. Accordingly, the front motor 41 can be satisfactorily positioned even in the front portion 13 which has a relatively small space. In addition, the degree of freedom of layout improves.

In other words, by using one of the front and rear wheels as referred to in the invention as front wheels, the degree of freedom of layout of the front portion 13 where a motor to drive the front wheels is provided can be improved.

Since no boost system to make the front motor 41 rotatable in the high-speed travel range is required, costs for the vehicle 10 can be prevented from highly increasing.

Even when the maximum rate of rotation of the front motor 41 is greater than that of the rear motor 51, i.e., when the rear motor 51 is larger than the front motor 41, the maximum rate of rotation of the rear wheels 12 corresponding to the maximum rate of rotation of the rear motor 51 can be made greater than the maximum rate of rotation of the front wheels 11 corresponding to the maximum rate of rotation of the front motor 41, by reducing the speed reduction ratio of the rear-wheel speed reducer 53 to be smaller than that of the front-wheel speed reducer 43.

In the present embodiment, the front wheels 11 are used as an example of one of the front and rear wheels as referred to in the invention, and the rear wheels 12 are used as an example of the other of the front and rear wheels as referred to in the invention. The front motor 41 is used as an example of a first electric drive motor as referred to in the invention, and the rear motor 51 is used as an example of a second electric drive motor as referred to in the invention.

However, even with a different structure, weight reduction and cost reduction can be achieved with maintaining ability to travel even in the high-speed travel range. For example, the rear wheels 12 may be another example of one of the front and rear wheels as referred to in the invention, and the rear motor 51 may be used as another example of the first electric drive motor. The front wheels 11 may be another example of the other of the front and rear wheels as referred to in the invention, and the front motor 41 may be used as another example of the second electric drive motor. In this case, the rear motor 51 can be made smaller, and therefore, the degree of freedom of layout of the rear portion 14 of the vehicle 10 can be improved.

Next, a front-and-rear-wheel-drive vehicle according to the second embodiment of the invention will be described with reference to FIGS. 7 to 8. Parts of a configuration which have the same functions as those of the first embodiments are denoted at the same reference signs as those of the first embodiment, and will be omitted from descriptions below.

In the present embodiment, an engine 81 is used for making vehicle 10 to travel by rotating front wheels 11, in addition to use of driving for electric charging. That is, in the present embodiment, the vehicle 10 is a hybrid electric car which can be driven to travel by a front motor 41, a rear motor 51, and the engine 81. The present embodiment differs from the first embodiment in that the engine 81 is used for traveling as described above. The other structures are the same as those of the first embodiment.

Figure 7:
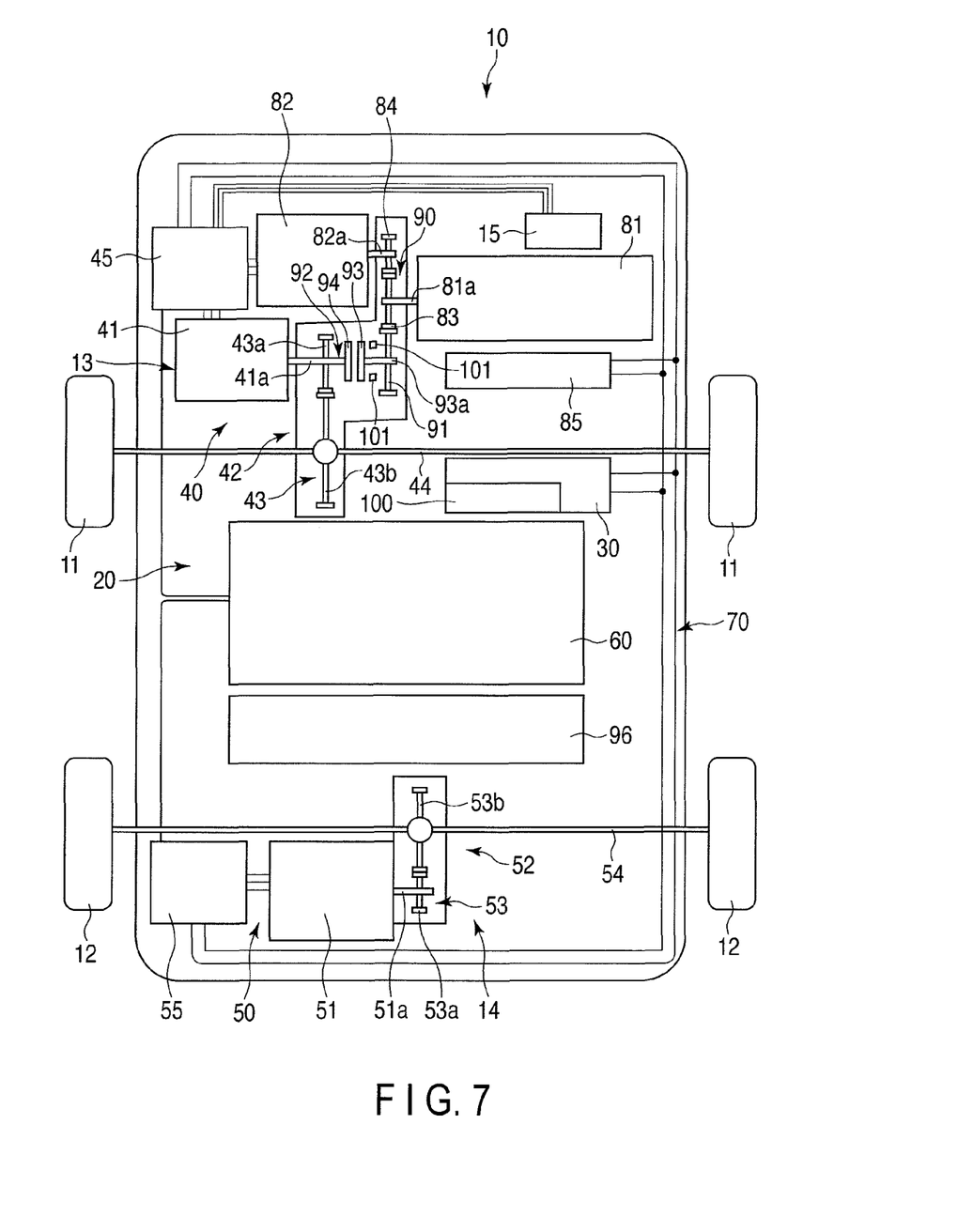
FIG. 7 is an exemplary schematic view showing a front-and-rear-wheel-drive vehicle according to the second embodiment of the invention.

FIG. 7 is a schematic view showing a vehicle 10 according to the present embodiment. As shown in FIG. 7, a front-wheel transmission mechanism 42 comprises an engine speed reducer 90 which transmits rotation of the engine 81 to the front wheels 11 in order that the engine 81 can rotate the front wheels 11. In the present embodiment, the engine 81 also functions as part of a front-wheel drive unit 40. The engine speed reducer 90 has a constant and invariable speed reduction ratio. That is an example of a speed reducer having a fixed ratio as referred to in the invention.

The engine speed reducer 90 comprises a fourth gear 83 provided on an output shaft 81a of the engine 81, a sixth gear 91, and a clutch mechanism 92. The sixth gear 91 engages with the fourth gear 83. The clutch mechanism 92 is an example of a friction engagement element as referred to in the invention. The clutch mechanism 92 comprises a plate 94 and a clutch disc 93. A shaft part 93a is provided at an end of the clutch disc 93 in a manner that the sixth gear 91 rotates integrally with the shaft part 93a. Therefore, the sixth gear 91 and clutch disc 93 rotate integrally. The plate 94 is provided integrally on an end of an output shaft 41a of the front motor 41, and rotates integrally with the output shaft 41a.

An actuator 101 is provided near the clutch disc 93. The clutch disc 93 is pressed, by an actuator 101, into contact with the plate 94. Further, the actuator 101 moves the clutch disc 93 to be positioned apart from the plate 94.

A connected state of the clutch mechanism 92 means that the clutch mechanism 92 is pressed into contact with the plate 94 and the clutch disc 93 and plate 94 rotate integrally. A disconnected state of the clutch mechanism 92 means that the clutch disc 93 and plate 94 are not in contact with but are distant from each other, and therefore, rotation of any one of the clutch disc 93 and the plate 94 is not transmitted to the other.

Operation of the actuator 101 is controlled by the clutch mechanism controller 100. The clutch mechanism controller 100 is provided in a vehicle controller 30. The clutch mechanism controller 100 is an example of a friction-engagement element controller as referred to in the invention.

Next, operation of the vehicle 10 will be described. FIG. 8 is a graph showing a relationship between a vehicle speed of the vehicle 10 and a total of a torque acting on a front-wheel axle 44 and a torque acting on a rear-wheel axle 54. In other words, FIG. 8 shows a relationship between the vehicle speed and the torques acting on the vehicle 10. In FIG. 8, the horizontal axis represents the vehicle speed of the vehicle 10. A unit of km/h is applied. Rightward escalation in the graph expresses increase in vehicle speed. In FIG. 8, the vertical axis represents a total of the torque acting on the front-wheel axle 44 and the torque acting on the rear-wheel axle 54. A unit of N*m is applied. Upward escalation along the vertical axis of the graph expresses increase in torque.

Figure 8:
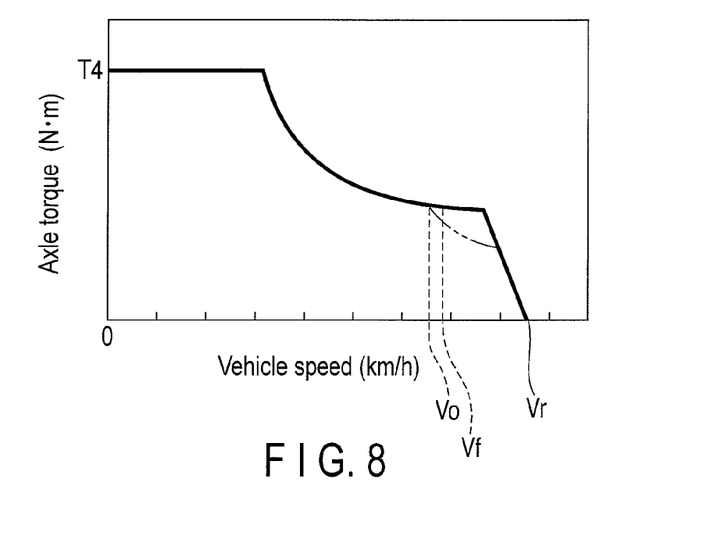
FIG. 8 is an exemplary graph showing a relationship between a vehicle speed of a vehicle shown in FIG. 7 and a total of a torque acting on a front-wheel axle of the vehicle and a torque acting on a rear-wheel axle.

As shown in FIG. 8, the front motor 41 and rear motor 51 rotate until the vehicle speed of the vehicle 10 exceeds a speed per hour Vo from which the torque of the front motor 41 abruptly drops. At this time, the engine controller 85 puts the clutch mechanism 92 into the disconnected state. The rotation of the front motor 41 is therefore not transmitted to the engine 81. Even when the engine 81 is driven to electrically charge the battery 60, the rotation of the engine 81 is not transmitted to the front wheels 11.

When the speed per hour Vo from which the torque of the front motor 41 abruptly drops is exceeded, the vehicle controller 30 transmits a signal to stop supply of electric power to the front motor 41 in order to stop traveling by the front motor 41. The front motor inverter 45 receives the signal from the vehicle controller 30 and then stops supplying the front motor 41 with a three-phase alternating current.

Subsequently, when the vehicle speed exceeds the speed per hour Vo, the vehicle controller 30 transmits a signal to drive the engine 81. The engine controller 85 receives the signal from the vehicle controller 30, and then drives the engine 81. When the engine 81 is driven, the clutch mechanism controller 100 then puts the clutch mechanism 92 into the connected state. Rotation of the output shaft 81a of the engine 81 is thereby transmitted to the front wheels 11 by a front-wheel transmission mechanism 42, and the front wheels 11 therefore rotate.

As shown in FIG. 8, the torque which acts on the front wheels 11 takes values which form a gentle continuous torque curve. This feature will now be specifically described. In FIG. 8, a torque curve in a case that the torque of the engine 81 does not act on the front wheels 11 will be expressed as a two-dot chain line. The case that the torque of the engine 81 does not act on the front wheels 11 is the same as that of a torque curve shown in FIG. 6 used in the first embodiment.

As indicated by the two-dot chain line, in the case that the torque of the engine 81 does not act on the front wheels 11, the torque acting on the vehicle 10 abruptly drops when the speed per hour Vo from which the torque of the front motor 41 abruptly drops is exceeded. In the present embodiment, the torque of the engine 81 acts so as not to generate such abrupt reduction in torque and so as to make the torque curve gentle. In other words, the engine 81 drives so as not to supply such a torque that makes the torque curve gentle.

When the speed of the vehicle 10 becomes not greater than the speed per hour Vo, the vehicle controller 30 stops driving of the engine 81, and transmits a signal to start driving the front wheels 11 by the front motor 41.

The engine controller 85 receives the signal and stops driving of the engine 81, and the clutch mechanism controller 100 puts the clutch mechanism 92 in the disconnected state. The front motor inverter 45 starts supply of a three-phase alternating current to drive the front motor 41.

Also in the present embodiment, operation in the case of electrically charging the battery 60 is the same as that of the first embodiment.

In the present embodiment, the same effects as in the first embodiment can be attained, and the torque acting on the vehicle 10 can be restricted from abruptly dropping.

The engine speed reducer 90 has a structure in which the speed reduction ratio is constant. Therefore, the structure of the engine speed reducer 90 can be simplified and made smaller. Further, the engine speed reducer 90 is provided in the front portion 13, and therefore, a degree of freedom of layout of the front portion 13 can be improved.

In the second embodiment, when the vehicle speed exceeds the speed from which the torque of the front motor 41 abruptly drops, the engine 81 is driven in place of the front motor 41 and is controlled to make the torque curve of the vehicle 10 gentle. The speed per hour Vo from which the torque abruptly drops is near the speed per hour Vf as the vehicle speed corresponding to the maximum rate of rotation of the front motor 41. That is, putting the clutch mechanism 92 into the connected state and driving the engine 81 at the same time, at the speed per hour Vo from which the torque abruptly drops, are examples of engaging the friction engagement element near the vehicle speed corresponding to the maximum rate of rotation of the first electric drive motor and transmitting a drive force of the engine to one of the front and rear wheels, by the friction engagement element controller as referred to in the invention.

However, the embodiment is not limited hitherto. For example, when the vehicle speed exceeds the speed per hour Vo, the front motor 41 may be driven. In this case, from the speed per hour Vo to the speed per hour Vf (including Vf), the front wheels 11 of the vehicle 10 are driven by the front motor 41 and engine 81. The engine 81 is controlled in a manner that the rate of rotation of the clutch disc 93 is equal to the rate of rotation of the front motor 41 and that the torque curve of the vehicle 10 is gentle.

Alternatively, when the vehicle speed reaches the speed per hour Vf corresponding to the maximum rate of rotation of the front motor 41, the engine 81 may be driven and the clutch mechanism 92 may be put in the connected state.

In the present embodiment, the front wheels 11 are used as an example of one of the front wheels as referred to in the invention, and the rear wheels 12 are used as an example of the other of the front and rear wheels as referred to in the invention. The front motor 41 is used as an example of a first electric drive motor as referred to in the invention, and the rear motor 51 is used as an example of a second electric drive motor as referred to in the invention.

However, even with a different structure, weight reduction and cost reduction can be achieved with maintaining ability to travel even in the high-speed travel range. For example, the rear wheels 12 may be another example of one of the front and rear wheels as referred to in the invention, and the rear motor 51 may be used as another example of the first electric drive motor. The front wheels 11 may be another example of the second wheels each as referred to in the invention, and the front motor 41 may be used as another example of the second electric drive motor. In this case, the rear motor 51 can be made smaller, and therefore, the degree of freedom of layout of the rear portion 14 of the vehicle 10 can be improved.

The invention is not exactly limited to the foregoing embodiments but may be embodied with components thereof modified within a range not deviating from the subject matter of the invention in practical phases. Various inventions can be derived from appropriate combinations of a plurality of components disclosed in the foregoing embodiments. For example, several components may be deleted from all the components disclosed in the foregoing embodiments. Further, components may be appropriately combined among different embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A front-and-rear-wheel-drive vehicle which drives front and rear wheels comprising:
    a first electric drive motor which drives one of the front and rear wheels;
    a second electric drive motor which drives the other of the front and rear wheels, and has a maximum torque greater than a maximum torque of the first electric drive motor and a maximum rate of rotation smaller than a maximum rate of rotation of the first electric drive motor;
    a first speed reducer which reduces rotation of the first electric drive motor and transmits the reduced rotation to the one of the front and rear wheels;
    a second speed reducer which reduces rotation of the second electric drive motor at a speed reduction ratio smaller than a speed reduction ratio of the first speed reducer, and transmits the reduced rotation to the other of the front and rear wheels, wherein
    the speed reduction ratios of the first and second speed reducers are set in a manner that a maximum rate of rotation of the other of the front and rear wheels corresponding to a maximum rate of rotation of the second electric drive motor is greater than a maximum rate of rotation of the one of the front and rear wheels corresponding to a maximum rate of rotation of the first electric drive motor.

2. The front-and-rear-wheel-drive vehicle according to claim 1, further comprising:
    an engine which drives the one of the front and rear wheels;
    a friction engagement element which transmits and shuts off a power transmitted from the engine to the one of the front and rear wheels; and
    a friction engagement element controller which controls the friction engagement element, wherein
    the friction-engagement element controller engages the friction engagement element, nearly at a vehicle speed corresponding to the maximum rate of rotation of the first electric drive motor, and thereby transmits a drive force of the engine to the one of the front and rear wheels.

3. The front-and-rear-wheel-drive vehicle according to claim 2, wherein
    rotation of the engine is transmitted to the one of the front and rear wheels by a speed reducer having a fixed ratio.

4. The front-and-rear-wheel-drive vehicle according to claim 1, wherein
    the one of the front and rear wheels is a front wheel of the vehicle, and the other of the front and rear wheels is a rear wheel of the vehicle.

5. The front-and-rear-wheel-drive vehicle according to claim 2, wherein
    the one of the front and rear wheels is a front wheel of the vehicle, and the other of the front and rear wheels is a rear wheel of the vehicle.

6. The front-and-rear-wheel-drive vehicle according to claim 3, wherein
    the one of the front and rear wheels is a front wheel of the vehicle, and the other of the front and rear wheels is a rear wheel of the vehicle.

* * * * *